United States Patent
Kumar Karn

(10) Patent No.: US 11,314,939 B2
(45) Date of Patent: Apr. 26, 2022

(54) METHOD AND APPARATUS FOR PERFORMING HIERARCHIACAL ENTITY CLASSIFICATION

(71) Applicant: Siemens Aktiengesellschaft, Munich (DE)

(72) Inventor: Sanjeev Kumar Karn, Munich (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 235 days.

(21) Appl. No.: 16/500,014

(22) PCT Filed: Jan. 24, 2018

(86) PCT No.: PCT/EP2018/051704
§ 371 (c)(1),
(2) Date: Oct. 1, 2019

(87) PCT Pub. No.: WO2018/184746
PCT Pub. Date: Oct. 11, 2018

(65) Prior Publication Data
US 2020/0117856 A1    Apr. 16, 2020

(30) Foreign Application Priority Data
Apr. 3, 2017 (EP) .................................... 17164615

(51) Int. Cl.
*G06F 17/00* (2019.01)
*G06F 40/295* (2020.01)
*G06F 40/30* (2020.01)
*G06N 3/04* (2006.01)

(52) U.S. Cl.
CPC ............ *G06F 40/295* (2020.01); *G06F 40/30* (2020.01); *G06N 3/0454* (2013.01)

(58) Field of Classification Search
None
See application file for complete search history.

(56) References Cited

U.S. PATENT DOCUMENTS

2015/0066496 A1    3/2015   Deoras et al.
2018/0067918 A1*   3/2018   Bellegarda ............. G06F 40/263
2018/0307678 A1*  10/2018   Anantaram ............. G06N 3/08

OTHER PUBLICATIONS

Sonse Shimaoka et al.,"Neural Architectures for Fine-Grained Entity Type Classification", arxiv. org, Cornell University Library, Ithaka, NY, 14853, Jun. 4, 2016 (Year: 2016).*
Sonse Shimaoka et al., "Neural Architectures for Fine-Grained Entity Type Classification", arxiv.org, Cornell University Library, Ithaka, NY, 14853, Jun. 2016 (Year: 2016).*
(Continued)

*Primary Examiner* — Satwant K Singh
(74) *Attorney, Agent, or Firm* — Schmeiser, Olsen & Watts LLP

(57) ABSTRACT

A method for performing hierarchical entity classification of an entity mention within a context, wherein ontological classes are computed for the entity mention levelwise using a contextual representation of the context and a state representation obtained by running an end-to-end trained decoding recurrent neural network on a mention representation of the entity mention.

13 Claims, 2 Drawing Sheets

(56) References Cited

OTHER PUBLICATIONS

Karn Sanjeev Kumar et al: "End-to-End Trainable Attentive Decoder for Hierarchical Entity Classification", pp. 752-758, XP055405178, Retrieved from the Internet: URL:http://www.aclweb.org/anthology/E17-2119, retrieved on Sep. 8, 2017, the whole document; 2017.
Ling Xiao et al: "Fine-Grained Entity Recognition", XP055404940, Retrieved from the Internet: URL:http://www.cs.washington.edu/ai/pubs/ling-aaai12.pdf [retrieved on Sep. 8, 2017], the whole document; 2012.
Abhishek Ashid Anand et al: "Fine-Grained Entity Type Classification by Jointly Learning Representations and Label Embeddings", arxiv.org, Cornell University Library, 201 Olin Library Cornell University Ithaca, NY 14853, XP080748104, sections 3.3-3.5; 2017.
Shimaoka Sonse et al: "Neural Architectures for Fine-grained Entity Type Classification", arxiv.org, Cornell University Library, 201Olin Library Cornell University Ithaca, NY14853, XP080705890, section 3; 2016.
Yosef Mohamed Amir et al: "HYENA: Hierarchical Type Classification for Entity Names", Proceedings of COLING 2012: Posters COLING 2012, pp. 1361-1370, XP055404951, retrieved from the Internet: URL:http://www.aclweb.org/anthology/C12-2133, retrieved on Sep. 11, 2017, the whole document; 2012.
Dong Li et al: "A Hybrid Neural Model for Type Classification of Entity Mentions", Proceedings of the Twenty-Fourth International Joint Conference on Artificial Intelligence (IJCAI 2015), XP055404959, Retrieved from the Internet: URL:https://www.ijcai.org/Proceedings/15/Papers/179.pdf, retrieved on Sep. 8, 2017, section 1, 3rd paragraph, section 3; 2015.
Shi Baoguang et al: "An End-to-End Trainable Neural Network for Image-based Sequence Recognition and Its Application to Scene Text Recognition", XP055405545, retrieved from the Internet: URL:https://ai2-s2-pdfs.s3.amazonaws.com/8e91/49ab00236d04db23394774e716c4fld89231.pdf, retrieved on Sep. 12, 2017, the whole document; 2015.
PCT International Search Report and Written Opinion of International Searching Authority dated May 4, 2018 corresponding to PCT International Application No. PCT/EP2018/051704 filed Jan. 24, 2018.

* cited by examiner

Figure 1:
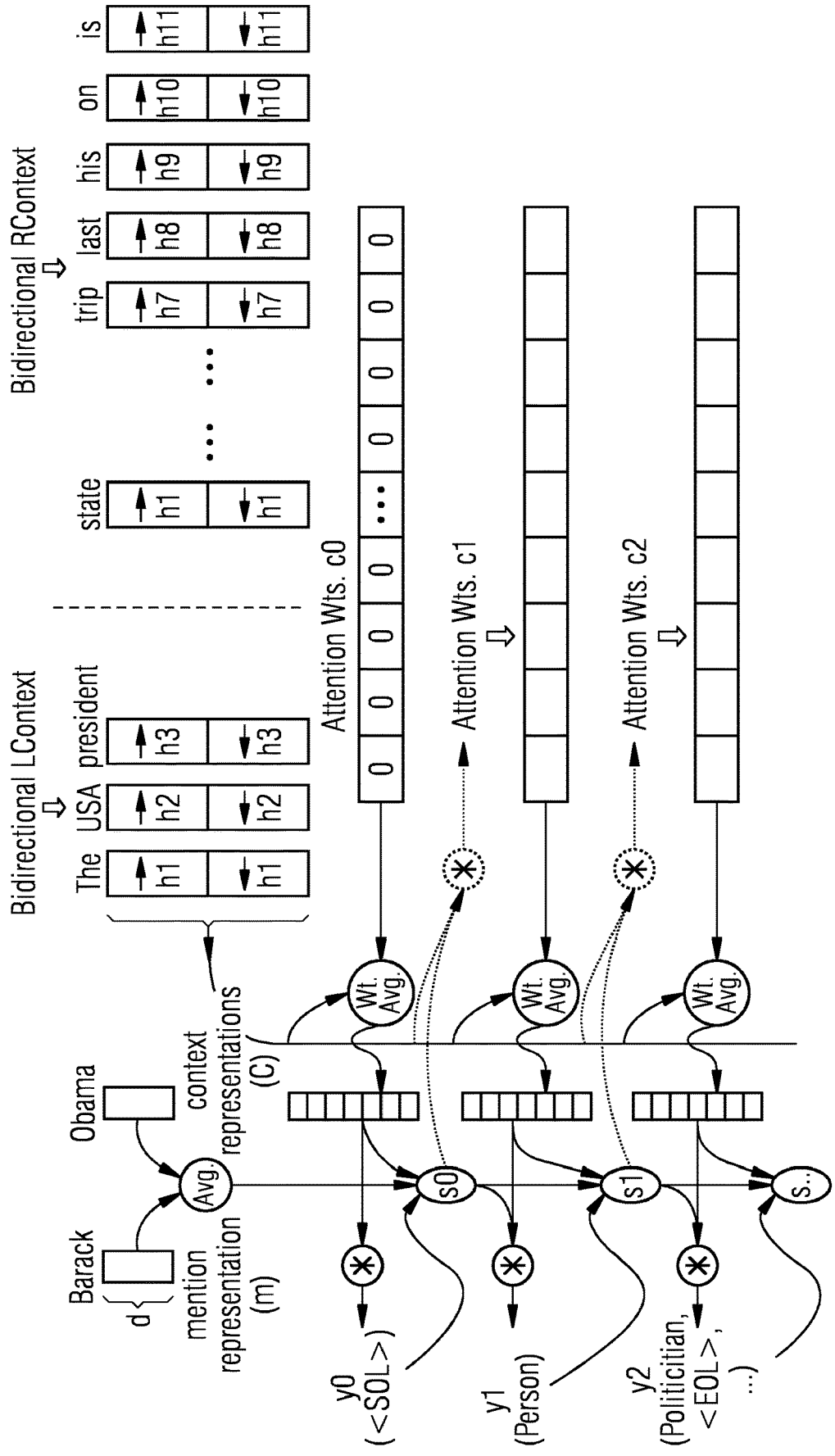

FIG 1   S = "The USA president Barack Obama is on his last trip to Germany as head of state"

METHOD AND APPARATUS FOR PERFORMING HIERARCHIACAL ENTITY CLASSIFICATION

CROSS-REFERENCE TO RELATED APPLICATIONS

This application claims priority to PCT Application No. PCT/EP2018/051704, having a filing date of Jan. 24. 2018, which is based on European Application No. 17164615.1 having a filing date of Apr. 3, 2017, the entire contents both of which are hereby incorporated by reference.

FIELD OF TECHNOLOGY

The following relates to a method and apparatus for performing hierarchical entity classification of an entity mention within a context.

BACKGROUND

The recognition of an entity is used to extract information from a text. In general, entity recognition basically involves a first task of identifying a region of text, i.e. mention, over a sentence and assigning a label to the identified region of text. In many conventional methods for entity recognition, both tasks are performed in a single step. However, these conventional single step methods for entity recognition involve a dataset with a small set of simple labels, i.e. without any fine granularity. For example, MUC-7 has only three classes, i.e. a person, location and organization. The introduction of finer entity label taxonomy like FIGER with 113 types, HYENA with 505 types reintroduced entity recognition as popular two-step processes comprising entity segmentation followed by entity typing. The reason for this move from a traditional one-stage process to a two-stage process or pipeline can be attributed to the complexity of one-stage models for performing fine entity recognition. Any one-stage exponential entity recognition model like CRF comprises a state space corresponding to segmentation types times semantic types. Introducing a larger class set into a one short process does increase the complexity of learning drastically. The multilabel nature of a fine entity typing dataset does increase the state space of the exponential model further. Consequently, conventional fine-grained recognition methods such as FIGER, HYENA do adopt a pipeline approach with separately trained segmentation and entity typing models.

Fine-grained entity typing involves classifying an entity mention in a specific context into classes such as {person}, {person/politician}, {person/writer}, etc. Fine-grained entity typing enhances the performance on tasks like named entity disambiguation, relation extraction and/or type question answering. A challenge for fine-grained entity typing is the absence of a human annotated dataset. Currently, most of the datasets are created using distant supervision. Basically, Wikipedia texts with anchor links can be utilized to obtain entity segments (mentions) using a knowledge database like Freebase, YAGO, etc. to obtain candidate types for the respective mention. However, using knowledge bases for obtaining candidate types does introduce various noise and complexities like unrelated labels. Not all candidate labels from the knowledge database do fit to a mention in a specific context. Accordingly, a large number of redundant labels are similar but expressed differently. Consequently, a large size label set is provided, i.e. an entity type set attributed to an entity in the knowledge base is large. In order to address these challenges, for example FIGER created its own tag set with 113 types by filtering irrelevant and merging similar labels. HYENA derives 505 subtype fine-grained taxonomy classes using a YAGO knowledge base. FIGER solved the fine-grained entity typing as a multiclass and multilabel problem where entity type hierarchies were flattened. Another conventional approach is the conversion of the entity typing problem into a hierarchical classification using multiple local classifiers and enforcing label consistency at interference time. HYENA addressed the problem of hierarchical classification by making use of multiple support vector machine classifiers corresponding to each label and by performing postprocessing the predictions using metaclassifiers.

SUMMARY

Accordingly, an aspect relates to a method and apparatus for performing entity classification with an increased performance.

The embodiments of the invention provide according to a first aspect a method for performing hierarchical entity classification of an entity mention within a context, wherein ontological classes are computed for the entity mention levelwise using a contextual representation of the context and a state representation obtained by running an end-to-end trained decoding recurrent neural network on a mention representation of said entity mention.

In a possible embodiment of the method for performing hierarchical entity classification according to the first aspect of the present invention, an input text is segmented into sentences each comprising a set of words and at least one entity mention within a sentence of the segmented input text is extracted for performing a hierarchical entity classification of the extracted entity mention.

In a further possible embodiment of the method for performing hierarchical entity classification according to the first aspect of the present invention, the contextual representation of a left context and of a right context around the extracted entity mention within the respective sentence is calculated using a bidirectional recurrent neutral network receiving word vectors of words of the left context and the right context.

In a further possible embodiment of the method for performing hierarchical entity classification according to the first aspect of the present invention, the calculated context representation consists of contextual hidden state vectors for each word of the left context and the right context around the extracted entity mention within the respective sentence.

In a further possible embodiment of the method for performing hierarchical entity classification according to the first aspect of the present invention, word vectors of words forming the entity mention are averaged to calculate as a mention representation a mention vector of the entity mention.

In a still further possible embodiment of the method for performing hierarchical entity classification according to the first aspect of the present invention, the calculated mention vector of the entity mention is mapped to a state vector of the decoding recurrent neural network using a feed-forward neural network.

In a still further possible embodiment of the method for performing hierarchical entity classification according to the first aspect of the present invention, the state vector of the decoding recurrent neural network is aligned with each contextual hidden state vector of the context representation to provide aligned match vectors.

In a still further possible embodiment of the method for performing hierarchical entity classification according to the first aspect of the present invention, an attention coefficient for each contextual hidden state vector of the context representation is calculated on the basis of the respective match vector.

In a still further possible embodiment of the method for performing hierarchical entity classification according to the first aspect of the present invention, a weighted average vector of the contextual hidden state vector of the context representation is calculated depending on the associated calculated attention coefficients.

In a still further possible embodiment of the method for performing hierarchical entity classification according to the first aspect of the present invention, the ontological classes for the entity mention are computed levelwise on the basis of the calculated weighted average vector and the current state vector of the decoding recurrent neural network.

In a still further possible embodiment of the method for performing hierarchical entity classification according to the first aspect of the present invention, the computed ontological classes of the entity mention are stored along with the entity mention in a knowledge database.

In a still further possible embodiment of the method for performing hierarchical entity classification according to the first aspect of the present invention, each entity mention comprises at least one noun word within a context of an input text.

In a still further possible embodiment of the method for performing hierarchical entity classification according to the first aspect of the present invention, the entity mention extracted from a segmented sentence is trimmed to a first maximum number of words and/or the left context and right context around the extracted entity mention is trimmed to a second maximum number of words.

In a still further possible embodiment of the method for performing hierarchical entity classification according to the first aspect of the present invention, a loss function is used for training the decoding recurrent neural network.

The embodiments of the invention provide according to a second aspect a system for hierarchical entity classification of entity mentions within a context of an input text, said system comprising
a computation unit adapted to compute for each entity mention ontological classes using a contextual representation of the context and a state representation obtained by running an end-to-end trained recurrent neural network of the system on a mention representation of the respective entity mention.

BRIEF DESCRIPTION

Figure 2:
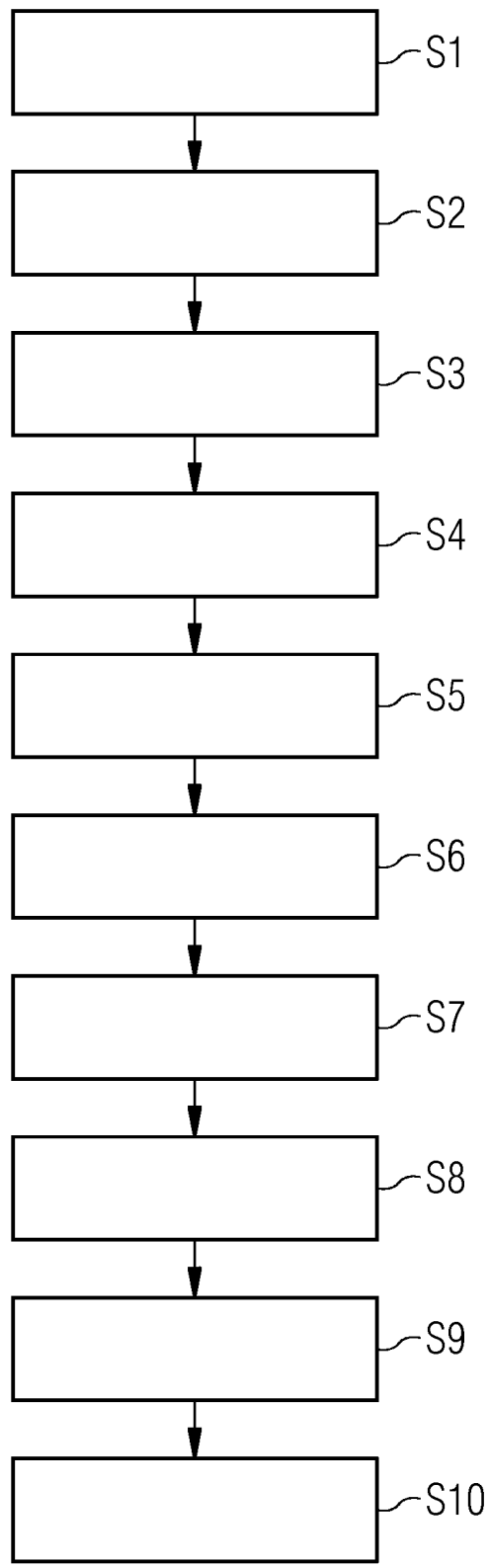

Some of the embodiments will be described in detail, with reference to the following figures, wherein like designations denote like members, wherein:

FIG. 1 shows a schematic diagram for illustrating the operation of a classification system according to an aspect of the present embodiments of the invention; and FIG. 2 shows a flowchart for illustrating a possible exemplary embodiment of a method for performing hierarchical entity classification of an entity mention according to a further aspect of the present embodiments of the invention.

DETAILED DESCRIPTION

FIG. 1 is a schematic diagram for illustrating the operation of a method and system for performing hierarchical entity classification according to the present embodiments of the invention.

The classification system used for performing hierarchical entity classification of entity mentions receives in a first step S1 as illustrated in FIG. 2 an input text which is segmented in step S1 into different sentences S wherein each sentence S comprises a set of words w. In the illustrated example of FIG. 1, the sentence S derived from the input text by segmentation is as follows: "The USA president Barack Obama is on his last trip to Germany as head of state". The input text comprises a plurality of different sentences S which are separated from each other by a colon. In a first processing step, the received input text is segmented automatically into sentences S each comprising several words w.

In a further step S2, at least one entity mention within the segmented sentence S is extracted. In a possible embodiment, each entity mention comprises at least one noun word within a context of the segmented input text sentence. The sentence S can comprise several mentions. For instance, in the given example, possible mentions are "USA", "Barack Obama" or "Germany". In a possible embodiment, each entity mention within the segmented sentence S is extracted for performing a hierarchical entity classification of the extracted entity mention. For example, the mention "Barack Obama" is extracted comprising as a first word "Barack" and as a second word "Obama". The mention in general is a noun phrase consisting of nouns and prepositions. For instance "Technical University of Munich" comprises the nouns "University" and "Munich" and the preposition "of". The words of the mention are converted into corresponding word vectors as also illustrated in FIG. 1. This conversion is performed by a word2vec conversion generating word vectors of the dimension d as illustrated in FIG. 1. In a possible embodiment, the word vectors of the entity mention are averaged to calculate a mention vector m of the entity mention as illustrated in FIG. 1.

After segmentation of the input text into sentences in step S1 and the extraction of the entity mention in step S2, a left context and a right context around the extracted entity mention within the sentence S is calculated in step S3 using a bidirectional recurrent neural network, RNN, receiving word vectors of words of the left context and the right context within the sentence. In the illustrated example of FIG. 1, the left context of the mention "Barack Obama" is "The USA president". The right context of the mention "Barack Obama" within the sentence S is "is on his last trip to Germany as head of state". In a possible implementation, a trimming of the left and right context can be performed. In a possible embodiment, the left context and the right context around the extracted entity mention is trimmed to a maximum number of words. In the illustrated example of FIG. 1, the left context "The USA president" comprises three words x1, x2, x3. The right context of the mention "Barack Obama", i.e. "is on his last trip to Germany as head of state" comprises eleven words x1 to x11. In a possible embodiment, the left and/or right context can be trimmed to a maximum number of words, for instance to a maximum number of ten words. In this implementation, the last word "state" of the right context would be deleted from the right context to provide a maximum number of ten words for the right context. In a still further possible exemplary embodiment, the left and/or right context sequence of words can be sorted or swapped. In the example illustrated in FIG. 1, the sequence of words in the right context can be rearranged so that the last word of the right context "state" comes first before the right context representation. Further implementations and/or embodiments are possible. For example, in a further possible embodiment, also the entity mention extracted from a segmented sentence S can be trimmed to a maximum number of words. In the illustrated example of FIG. 1, the entity mention comprises two words, i.e. the first word "Barack" and the second word "Obama". In a possible embodiment, the entity mention might be trimmed to a single word or a noun. The maximum numbers of words used for trimming of the entity mention and/or used for trimming of the left and right context can vary depending on the use case.

In general, the segmented sentence S consists of a sequence of words x.

$S = \{x_1, \ldots x_s\}$, wherein each word x is represented by a vector of dimension d. Word vectors can be obtained by using word embedding matrix $W_{emb}$ and an index of the word in a vocabulary.

The mention m also consists of words.

$m = \{x_b, \ldots x_r\}$

The context of the mention consists of the right context $R_c$, $R_c = \{x_{r+1}, \ldots x_{r+w}\}$, and the left context $L_c$, $L_c = \{x_{b-1}, \ldots x_{b-w}\}$, wherein the left context $L_c$ and the right context $R_c$ have a size of w each.

The vector m is an average of r−b+1 word vectors from entity mention m.

The contextual representation C of the left context and the right context around the extracted mention m within the respective sentence S can be calculated in a possible embodiment using a bidirectional recurrent neural network, BI-RNN, receiving word vectors of words of the left context and of the right context. As illustrated in FIG. 1, a bidirectional recurrent neural network comprises hidden state vectors h for each word vector of the left and right context. For instance, there is a forward hidden state vector for the word "the" in the left context and a backward hidden state vector for the same word "the" in the left context. The same applies for each word of the right context. For instance, there is a first forward hidden state vector for the word "is" of the right context and a backward hidden state vector for the same word "is" in the right context as also illustrated in FIG. 1. In the given example for the respective sentence S "The USA president Barack Obama is on his last trip to Germany as head of state", there are three forward hidden state vectors and three backward hidden state vectors for the three words of the left context "The USA president" and eleven forward hidden state vectors and eleven backward hidden state vectors for the words of the right context "is on his last trip to Germany as head of state". For the forward hidden state vector and the backward hidden state vector each word is concatenated, wherein each hidden state vector comprises a dimension of p. Accordingly, the hidden state in the recurrent neural network RNN is represented by a vector $h \in \mathbb{R}^p$, wherein p is its size. The context representation C can be can be formed by a stack of left and right context representations along a time dimension or sequence. A context can be represented by a matrix of size 2w×2p, wherein each column of C consists of two hidden state vectors h (i.e. a forward hidden state vector and a backward hidden state vector) each of dimension 2p. The attentive RNN encoder-decoder is used for hierarchical classification. The encoder-decoder can perform a classification by generating a path in the hierarchy from a top node to leaf nodes. On each step of the path, a part of the input to the encoder-decoder can be formed by an attention-weighted sum of the states of a bidirectional gated recurrent unit GRU of the recurrent neural network RNN. A decoder-based hierarchical classification can use a mention boundary parameter m and a context window size parameter w to extract a left context, a right context and a mention. Words from the left context, the right context and mention are then converted to a set of embedding vectors $L_c$, $R_c$ and M, respectively.

The mention representation m can be formed by an average of vectors in M obtained through equation (1).

$$m = \frac{1}{|M|} \sum_{j=1}^{|M|} m_j \qquad (1)$$

wherein $m_j$ is a $j^{th}$ vector in the M set. Each context representation C can be formed by a stack of the left and right context representations according to equation (2).

$$C = \begin{bmatrix} L_c \\ R_c \end{bmatrix} \qquad (2)$$

wherein $L_c$ and $R_c$ refers to the left and right context representations, respectively. Each of these context representations $L_c$, $R_c$ is itself a stack of hidden state vectors h obtained at different time steps t of a bidirectional gated recurrent unit GRU with an activation function f as indicated in equation (3).

$$h_t = f(x_t, h_{t-1}) \qquad (3)$$

wherein $x_t$ is an input vector at time step t and $h_{t-1}$ is a hidden state of a previous time step. Depending upon source $x_t$, i.e. either a left context representation $L_c$ or a right context representation $R_c$ is obtained. Since a bidirectional gated recurrent unit GRU is used each element of $L_c$ or $R_c$ is in $\mathbb{R}^{2p}$ forming a stack of forward and recurrent states.

After having calculated the contextual representation C of the left context and the right context of the extracted entity mention in step S3 and after having calculated as a mention representation the mention vector of the entity mention in step S4, the calculated mention vector of the entity mention is mapped in step S5 to a state vector of the decoding recurrent neural network RNN using a feed-forward neural network. In a possible embodiment, the mention vector is mapped to an initial state vector $s_0$ of the decoding recurrent neural network using a weight matrix W representing a feed-forward neural network. Accordingly, the mention vector with the dimension d can be mapped to the state vector having a dimension p.

In a further step S6, the state vector of the decoding recurrent neural network RNN can be aligned with each contextual hidden state vector of the context representation to provide aligned match vectors e, $e_{ij} = att(s_{j-1}, C_j)$, wherein att can be formed by a feed-forward network with a softmax output layer and wherein $C_j$ is the $j^{th}$ column of the representation matrix C.

In a further step S7, an attention coefficient $\alpha_{ij}$ for each contextual hidden state vector h of the context representation can be calculated on the basis of the respective match vector $e_{ij}$.

The attentive decoder can use a stacked context representation C and the mention representation as an input to produce a set of hierarchical entity types y for any mention.

As illustrated in FIG. 1, a prediction at each level y can be obtained using a function g according to equation (4).

$$y = g(s_i, c_i) \quad (4)$$

wherein g represents a feed-forward network with element-wise sigmoidal and wherein $s_i$ represents an RNN hidden state obtained through equation (5) and wherein $c_i$ is a weighted sum of context representation at decoding time step i.

$$s_i = f(s_{i-}, y_{i-1}, c_1) \quad (5)$$

wherein $c_i$ is a context vector at the $i^{th}$ interval computed through equation (6).

$$c_i = \sum_{j=1}^{2w} \alpha_{ij} h_j \quad (6)$$

wherein $h_j$ is a hidden representation for the $j^{th}$ context and wherein w is the window parameter fixing the size of the context representation to 2w.

The attention coefficient or an annotation weight $\alpha_{ij}$ can be obtained using the following equation (7).

$$\alpha_{ij} = \frac{\exp(e_{ij})}{\sum_{k=1}^{2w} \exp(e_{ij})} \quad (7)$$

wherein $e_{ij}$ is the match vector which can be obtained through a simple feed-forward neural network a taking state $s_{i-1}$ and context representation at the $j^{th}$ position $h_j$ as given in equation (8).

$$e_{ij} = a(s_{i-1}, h_j) \quad (8)$$

After having calculated the attention coefficient $\alpha_{ij}$ in step S7, a weighted average vector $C_i$ of the contextual hidden state vectors h of the context representation C is calculated in step S8 on the basis of the associated calculated attention coefficient $\alpha_{ij}$ according to equation (6) indicated above.

In a further step S9, the ontological classes y of the entity mention can be computed levelwise on the basis of the calculated weighted average vector $C_i$ and the current state vector of the decoding recurrent neural network as also illustrated in FIG. 1. As can be seen in FIG. 1, the initial coefficients for each bidirectional hidden state of the context are zero.

As can be seen in FIG. 1, the initial output y0 can be formed by a dummy symbol SOL (Start Of Label). Initial attention weights are set to zero. At each path generation step attention weights $\alpha_{ij}$ are computed to calculate the next ontological class $y_i$ as shown in FIG. 1. The ontological class of the first level y1 is in the illustrated exemplary embodiment the class "person". The next ontological class y2 is in the illustrated example "politician". The next ontological class calculated otherwise can be for instance "head of state". The number of classes within the used complex hierarchical ontology can vary. For instance, FIGER uses 112 different classes or types. Accordingly, the ontological classes y are computed in step S9 levelwise on the basis of the calculated weighted average vector and the current state vector of the decoding recurrent neural network RNN.

The computed ontological classes y of the entity mention can then be stored in step S10 along with the entity mention in a knowledge database for further processing. In a possible embodiment, a loss function can be used for training the bidirectional recurrent neural network. A loss L, at each level i of the hierarchy can be calculated depending on a binary cross entropy between sigmoidal prediction $y_i$ and a binary encoding truth $T_i$ as given in equation (9).

$$L = \sum_{k=1}^{l} -t_{ik} \log(y_{ik}) - (1 - t_{ik}) \log(1 - y_{ik}) \quad (9)$$

wherein l is the size the class vector. The levelwise loss can then be summed across the type hierarchy. A gradient evaluated on this can be used for learning. The entire setup is end-to-end trained with updated parameters. The objective is to minimize the total loss L, e.g. the sum of losses at each level of the hierarchy. It is possible to compute a Cartesian product of predicted types y at each level and filter out those paths that do not occur in training.

With the method according to the present invention, the state space of the recognition problem is segregated to segmentation and typing using a pipeline approach which uses the complexity of a fine-grained entity recognition. The state space of typing is reduced according to the method of the present embodiments of the invention as the types are divided along their hierarchy. With the method and system according to the present embodiments of the invention, entity type hierarchies are introduced using a recurrent neural network decoder providing an attention mechanism while predicting each level of the hierarchy. The used RNN decoder can have different attention weights at each level of the hierarchy through a sequential decoding process. The impact of state space reduction provided through hierarchical levelwise entity arrangement and distribution attention weights results in a higher performance in all types and/or classes. The method and system according to the present embodiments of the invention provides a fine-grained entity classification and uses an attention-based recurrent neural network RNN encoder-decoder that generates the path and the type hierarchy and which can be trained end-to-end. Each mention in a text can have several fine-grained types, for example "Barack Obama is both a politician and a writer or author of books". The method and apparatus according to the present embodiments of the invention provides for a finer granularity in the classification of a mention with a high performance.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for performing hierarchical entity classification of an entity mention within a context, the method comprising:
   computing ontological classes for the entity mention levelwise using a contextual representation of the context and a state representation obtained by running an end-to-end trained decoding recurrent neural network on a mention representation of the entity mention, wherein word vectors of words forming the entity mention are averaged to calculate as a mention representation a mention vector of the entity mention, and wherein the calculated mention vector of the entity mention is mapped to a state vector of the decoding recurrent neural network using a feed-forward neural network.

2. The method according to claim 1, wherein an input text is segmented into sentences each comprising a set of words and at least one entity mention within a sentence of the segmented input text is extracted for performing a hierarchical entity classification of the extracted entity mention.

3. The method according to claim 2, wherein the contextual representation of a left context and a right context around the extracted entity mention within the respective sentence is calculated using a bidirectional recurrent neutral network receiving word vectors of words of the left context and the right context.

4. The method according to claim 3, wherein the calculated context representation consists of contextual hidden state vectors for each word of the left context and the right context around the extracted entity mention within the respective sentence.

5. The method according to claim 1, wherein the state vector of the decoding recurrent neural network is aligned with each contextual hidden state vector of the context representation to provide aligned match vectors.

6. The method according to claim 5, wherein an attention coefficient for each contextual hidden state vector of the context representation is calculated on a basis of the respective match vector.

7. The method according to claim 6, wherein a weighted average vector of the contextual hidden state vectors of the context representation is calculated depending on the associated calculated attention coefficients.

8. The method according to claim 7, wherein the ontological classes of the entity mention are computed levelwise on a basis of the calculated weighted average vector and the current state vector of the decoding recurrent neural network.

9. The method according to claim 2 wherein the entity mention extracted from a segmented sentence is trimmed to a first maximum number of words and/or wherein the left context and right context around the extracted entity mention is trimmed to a second maximum number of words.

10. The method according to claim 1 wherein the computed ontological classes of the entity mention are stored along with the entity mention in a knowledge database.

11. The method according to claim 1 wherein each entity mention comprises at least one noun word within a context of an input text.

12. The method according to claim 1 wherein a loss function used for training the decoding recurrent neural network is calculated.

13. A system for a hierarchical entity classification of entity mentions within a context of an input text, the system comprising:
a computation unit adapted to compute for each entity mention ontological classes using a contextual representation of the context and a state representation obtained by running an end-to-end trained recurrent neural network, of the system on a mention representation of the respective entity mention, wherein the computation unit is adapted to average word vectors of words forming the entity mention to calculate as a mention representation a mention vector of the entity mention, and wherein the computation unit is adapted to map the calculated mention vector of the entity mention to a state vector of the decoding recurrent neural network using a feed-forward neural network.

* * * * *